UNITED STATES PATENT OFFICE.

IVAN LEVINSTEIN, OF MANCHESTER, ENGLAND, ASSIGNOR TO COMPANY OF LEVINSTEIN LIMITED, OF MANCHESTER, ENGLAND, A LIMITED LIABILITY COMPANY.

PREPARATION OF SULFO COMPOUNDS OF HYDROGENIZED FATS AND OILS AND OF COMPOSITIONS THEREWITH.

1,185,414.  Specification of Letters Patent.  Patented May 30, 1916.

No Drawing.  Application filed January 20, 1915. Serial No. 3,383.

*To all whom it may concern:*

Be it known that I, IVAN LEVINSTEIN, a subject of the King of Great Britain and Ireland, and a resident of Manchester, in the county of Lancaster, England, have invented a new and useful Preparation of Sulfo Compounds of Hydrogenized Fats and Oils and of Compositions Therewith, of which the following is a specification.

This invention relates to the production of compounds from hydrogenized saponifiable fats or oils and to the production therewith of compositions from waxes, fats, oils, or the like, which are soluble, miscible, or emulsifiable in water without the addition of alkali.

The compositions obtained are valuable in the preparation and treatment of leather, and in the textile industries, as special finishes.

In carrying this invention into effect hardened oils obtained by the hydrogenization of saponifiable fats or oils, such, for example, as hardened fish oil or hardened linseed oil, are treated under certain conditions with sulfuric acid. The sulfo compounds so obtained have the remarkable property of making mineral and other waxes, oils, fats, or the like (herein referred to for convenience as waxes) soluble, miscible or emulsifiable in water.

In order to obtain these sulfo compounds I take, say, hardened linseed oil, and after melting it treat it with sulfuric acid until a sample from the mass gives an emulsion with water, or until a washed sample practically dissolves in ammoniacal water. The mass is then poured into water previously heated to 30° C., when the sulfo compound will separate in the form of a white pulpy mass.

The following is an example of how a sulfo compound may be produced according to this invention and how such compound may be used to produce a soluble composition with mineral wax.

Example: 100 parts of hardened linseed oil are melted and then cooled to about 35° C. under agitation. 25 parts sulfuric acid (100% $H_2SO_4$ monohydrate preferred) are then added gradually and the temperature is kept between 40°–45° C. until a washed sample is practically soluble in hot water. The whole is then run into a salt solution (10° Tw.) which has been heated to a temperature of 30° C., is well stirred, and then allowed to settle, after which the salt water is drawn off. The washing with salt water is again repeated until the mineral acid has been removed, or the mineral acid may be neutralized with alkali. The sulfo acid of hardened linseed oil thus obtained when melted and mixed with equal parts of paraffin wax gives a composition which is practically soluble in hot water without the addition of alkali.

The hardened oils can be sulfonated when mixed with oils or greases, but the remarkable property possessed by the product of making waxes miscible or soluble or emulsifiable in water without neutralizing the sulfo acid or without any addition of alkali, appears to be to some extent diminished.

What I claim is:—

1. The preparation of sulfo compounds of hydrogenized fats or oils, which consists in melting the hardened oils obtained by the hydrogenization of saponifiable fats or oils, cooling them, treating them with sulfuric acid until a sample gives an emulsion with hot water, and pouring the mass into a salt solution of about 30° C. when the sulfo compound separates in the form of a white pulpy mass, substantially as hereinbefore described.

2. The preparation of compositions which are soluble, miscible or emulsifiable in hot water from waxes which consists in first melting the hardened oils obtained by the hydrogenization of saponifiable fats or oils, cooling them, treating them with sulfuric acid until a sample gives an emulsion with hot water and pouring the mass into a salt solution of about 30 degrees centigrade, when the sulfo compound separates in the form of a white pulpy mass, and mixing the sulfo compound obtained with equal parts of melted wax, substantially as set forth.

In witness whereof I have hereunto set my hand in the presence of two subscribing witnesses.

IVAN LEVINSTEIN.

Witnesses:
 FRANK A. HEYS,
 JOHN O'CONNELL.